(12) United States Patent
Kitahara et al.

(10) Patent No.: US 10,001,675 B2
(45) Date of Patent: Jun. 19, 2018

(54) LIQUID CRYSTAL DEVICE, METHOD OF MANUFACTURING LIQUID CRYSTAL DEVICE, AND ELECTRONIC APPARATUS

(71) Applicant: Seiko Epson Corporation, Tokyo (JP)

(72) Inventors: Hideki Kitahara, Chino (JP); Kazunari Sakamoto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 14/765,804

(22) PCT Filed: Feb. 20, 2014

(86) PCT No.: PCT/JP2014/000880
§ 371 (c)(1),
(2) Date: Aug. 4, 2015

(87) PCT Pub. No.: WO2014/129191
PCT Pub. Date: Aug. 28, 2014

(65) Prior Publication Data
US 2015/0370106 A1    Dec. 24, 2015

(30) Foreign Application Priority Data
Feb. 25, 2013    (JP) .................................. 2013-034263

(51) Int. Cl.
*G02F 1/1339* (2006.01)
*G02F 1/1341* (2006.01)
*G02F 1/1337* (2006.01)

(52) U.S. Cl.
CPC .......... *G02F 1/1339* (2013.01); *G02F 1/1341* (2013.01); *G02F 1/133734* (2013.01); *G02F 2001/133742* (2013.01)

(58) Field of Classification Search
CPC ................. G02F 1/1339; G02F 1/1341; G02F 1/133734; G02F 1/1337; G02F 2001/133738; G02F 2001/133742
See application file for complete search history.

(56) References Cited

U.S. PATENT DOCUMENTS

2006/0087604 A1* 4/2006 Shimizu ............ G02F 1/133734
349/125
2006/0088718 A1* 4/2006 Shimizu .............. C23C 14/0676
428/469

(Continued)

FOREIGN PATENT DOCUMENTS

CN          1949043 A     4/2007
JP       2005-107408 A     4/2005
(Continued)

OTHER PUBLICATIONS

Search Report received in International Application No. PCT/JP2014/000880, dated May 20, 2014.

*Primary Examiner* — Jia Pan
(74) *Attorney, Agent, or Firm* — ALG Intellectual Property, LLC

(57) ABSTRACT

There is provided a liquid crystal device having high reliability, a method of manufacturing a liquid crystal device, and an electronic apparatus. A liquid crystal device includes a seal material for sticking an element substrate and a counter substrate together, an encapsulant for filling an opening region in which the seal material is opened, a liquid crystal layer interposed by the element substrate and the counter substrate, a first inorganic alignment film provided between the element substrate and the liquid crystal layer, and a second inorganic alignment film provided between the counter substrate and the liquid crystal layer, in which at (Continued)

least the first inorganic alignment film is expanded and arranged in a region overlapping with the encapsulant in plan view.

9 Claims, 8 Drawing Sheets

(56) References Cited

U.S. PATENT DOCUMENTS

| | | | |
|---|---|---|---|
| 2006/0215103 A1* | 9/2006 | Miyashita | G02F 1/1341 349/153 |
| 2007/0002235 A1* | 1/2007 | Tanaka | G02F 1/133734 349/123 |
| 2007/0085954 A1 | 4/2007 | Terao et al. | |
| 2009/0237604 A1* | 9/2009 | Nagae | G02F 1/133719 349/124 |
| 2009/0239002 A1* | 9/2009 | Nagae | G02F 1/133719 428/1.2 |
| 2010/0006538 A1* | 1/2010 | Asuke | G02F 1/133719 216/23 |
| 2012/0092602 A1* | 4/2012 | Akagawa | G02F 1/133719 349/125 |

FOREIGN PATENT DOCUMENTS

| | | |
|---|---|---|
| JP | 2007-093672 A | 4/2007 |
| JP | 2008-083325 A | 4/2008 |
| JP | 2011-174966 A | 9/2011 |

* cited by examiner

LIQUID CRYSTAL DEVICE, METHOD OF MANUFACTURING LIQUID CRYSTAL DEVICE, AND ELECTRONIC APPARATUS

TECHNICAL FIELD

The present invention relates to a liquid crystal device, a method of manufacturing a liquid crystal device, and an electronic apparatus.

BACKGROUND ART

As one of the liquid crystal device described above, for example, an active driving system liquid crystal device including a transistor as an element switch-controlling a pixel electrode for each pixel is known. The liquid crystal device is used in, for example, a light valve of a direct viewing type display or a projector, or the like.

In a method of manufacturing the liquid crystal device, an inorganic alignment film is formed on a substrate over an effective display region to a region between the effective display region and a seal material in plane view, as described in, for example, PTL 1. Next, the seal material is formed so as to surround the effective display region on the substrate. Afterward, a pair of substrates are stuck together and a liquid crystal is injected into an area surrounded by the seal material through an injection port. After being injected, the injection port is filled with an encapsulant.

CITATION LIST

Patent Literature

PTL 1: Japanese Unexamined Patent Application Publication No. 2005-107408

SUMMARY OF INVENTION

Technical Problem

However, since the inorganic alignment film is formed in a region at an inner side than the seal material and a contact face between the encapsulant or the seal material and the substrate is relatively flat, the adhesion is poor, and thus there is a problem in that the encapsulant or the seal material is sometimes peeled off from the substrate.

Solution to Problem

Aspects of the invention are carried out to solve at least a part of such problems and can be realized in the following forms or application examples.

Application Example 1

According to this application example, there is provided a liquid crystal device including a first substrate, a second substrate arranged facing the first substrate, a seal material arranged between the first substrate and the second substrate, a liquid crystal layer arranged between the first substrate and the second substrate, an encapsulant filling the liquid crystal layer in an opening region of the seal material, a first inorganic alignment film arranged between the first substrate and the liquid crystal layer, and a second inorganic alignment film arranged between the second substrate and the liquid crystal layer, in which the first inorganic alignment film is arranged in a region overlapping with at least a part of a region in which the encapsulant is arranged when being viewed from the second substrate side.

According to this application example, since the first inorganic alignment film is expanded and provided under the encapsulant (a region overlapping in plane view), it becomes possible to make the first substrate uneven following an unevenness of a columnar structure (column) configuring the first inorganic alignment film. Therefore, when the encapsulant is provided in the opening region on the first substrate, the adhesive area to the encapsulant can increase due to an unevenness on the first substrate, and thus it is possible to suppress the peeling off the encapsulant from the first substrate.

Application Example 2

In the liquid crystal device according to the application example, it is preferable that the first inorganic alignment film is arranged so that a region in which the encapsulant is arranged is included when being viewed from the second substrate side.

According to this application example, since the first inorganic alignment film is provided under the encapsulant, it becomes possible to make the first substrate uneven following an unevenness of the columnar structure (column) configuring the first inorganic alignment film. Therefore, when the encapsulant is provided in the opening region on the first substrate, the adhesive area to the encapsulant can be further increased than that of Application Example 1 due to an unevenness on the first substrate, and thus it is possible to suppress the peeling off the encapsulant from the first substrate.

Application Example 3

In the liquid crystal device according to the application example, it is preferable that the first inorganic alignment film is arranged so as to overlap with at least a part of a region in which the seal material is arranged when being viewed from the second substrate side.

According to this application example, since the first inorganic alignment film is provided under the seal material, it becomes possible to make the first substrate uneven following an unevenness of the columnar structure (column) configuring the first inorganic alignment film. Therefore, when the seal material is provided in a seal material forming region on the first substrate, the adhesive area to the seal material can increase due to an unevenness on the first substrate, and thus it is possible to suppress the peeling off the seal material from the first substrate.

Application Example 4

In the liquid crystal device according to the application example, it is preferable that a surface layer is arranged between the first inorganic alignment film and the encapsulant.

According to this application example, since the surface layer is provided between the encapsulant and the first inorganic alignment film, it becomes possible to make a surface of the surface layer uneven following an unevenness of the columnar structure configuring the first inorganic alignment film. Therefore, when the encapsulant is provided in the opening region on the surface layer, the adhesive area to the encapsulant can increase due to an unevenness on the surface of the surface layer, and thus it is possible to suppress the peeling off the encapsulant from the surface layer. In addition, since the surface layer is provided, it becomes possible to enhance light resistance and it is possible to irradiate the liquid crystal device with strong light.

Application Example 5

According to this application example, there is provided a method of manufacturing a liquid crystal device including an inorganic alignment film forming step of forming a first inorganic alignment film on a first substrate, a seal material forming step of forming a seal material on the first substrate, a sticking step of sticking the first substrate and a second substrate together on which a second inorganic alignment film is formed through the seal material, an injecting step of injecting a liquid crystal between the first substrate and the second substrate from an opening region of the seal material, and an encapsulant forming step of forming an encapsulant which fills the liquid crystal in the opening region, in which the first inorganic alignment film is arranged in a region overlapping with at least a part of a region in which the encapsulant is arranged when being viewed from the second substrate side.

According to this application example, since the first inorganic alignment film is formed under the encapsulant, it becomes possible to make the first substrate uneven following an unevenness of the columnar structure (column) configuring the first inorganic alignment film. Therefore, when the encapsulant is formed in the opening region on the first substrate, the adhesive area to the encapsulant can increase due to an unevenness on the first substrate, and thus it is possible to suppress the peeling off the encapsulant from the first substrate.

Application Example 6

In the method of manufacturing a liquid crystal device according to the application example, it is preferable to have a surface treating step in which a surface of the first inorganic alignment film is subjected to a surface treatment.

According to this application example, since the first inorganic alignment film is subjected to the surface treatment, it becomes possible to make the surface of the surface layer which is subjected to the surface treatment uneven following an unevenness of the columnar structure configuring the first inorganic alignment film. Therefore, when the encapsulant is provided in the opening region on the surface layer, the adhesive area to the encapsulant can increase due to an unevenness on the surface of the surface layer, and thus it is possible to suppress the peeling off the encapsulant from the surface layer. In addition, since the surface layer is provided, it becomes possible to enhance light resistance and it is possible to irradiate the liquid crystal device with strong light.

Application Example 7

According to this application example, there is provided an electronic apparatus including the liquid crystal device described above.

In this case, since the electronic apparatus includes the liquid crystal device described above, it is possible to provide an electronic apparatus having high reliability.

DESCRIPTION OF EMBODIMENTS

Hereinafter, an embodiment of the invention will be described with reference to the drawings. Meanwhile, the drawings which are used are displayed by being appropriately enlarged or reduced so that a part corresponding to the description becomes recognizable.

Meanwhile, in the following descriptions, for example, "on a substrate" represents a case of being arranged so as to have contact with a substrate, a case of being arranged on a substrate through other components, a case of being partially arranged so as to have contact with a substrate and being partially arranged on a substrate through other components, or the like.

In the embodiment, description will be given by giving an active matrix type liquid crystal device including a thin film transistor (TFT) as a switching element of a pixel as an example of a liquid crystal device. The liquid crystal device can be suitably used, for example, as an optical modulation element (a liquid crystal light valve) of a projection type display apparatus (a liquid crystal projector).

<Configuration of Liquid Crystal Device>

Figure 1:
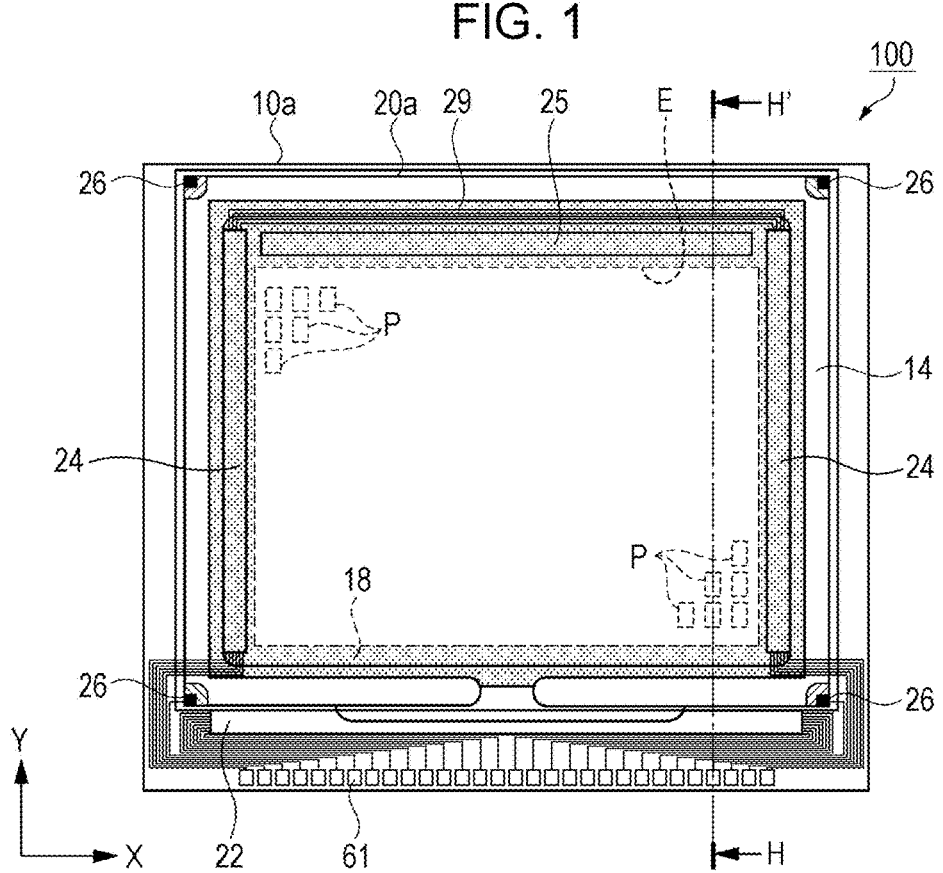
FIG. 1 is a schematic plane view illustrating a configuration of a liquid crystal device.
Figure 2:
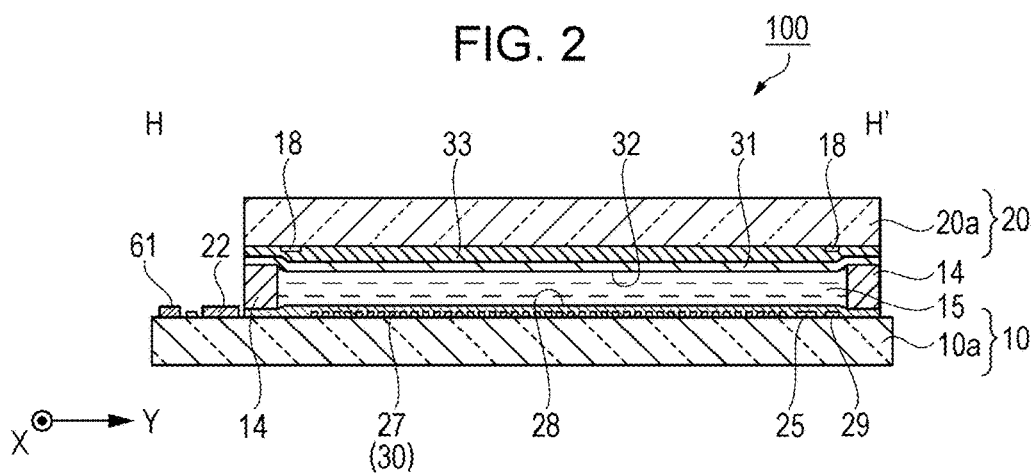
FIG. 2 is a schematic cross-section view taken along the line H-H' of the liquid crystal device shown in FIG. 1.
Figure 3:
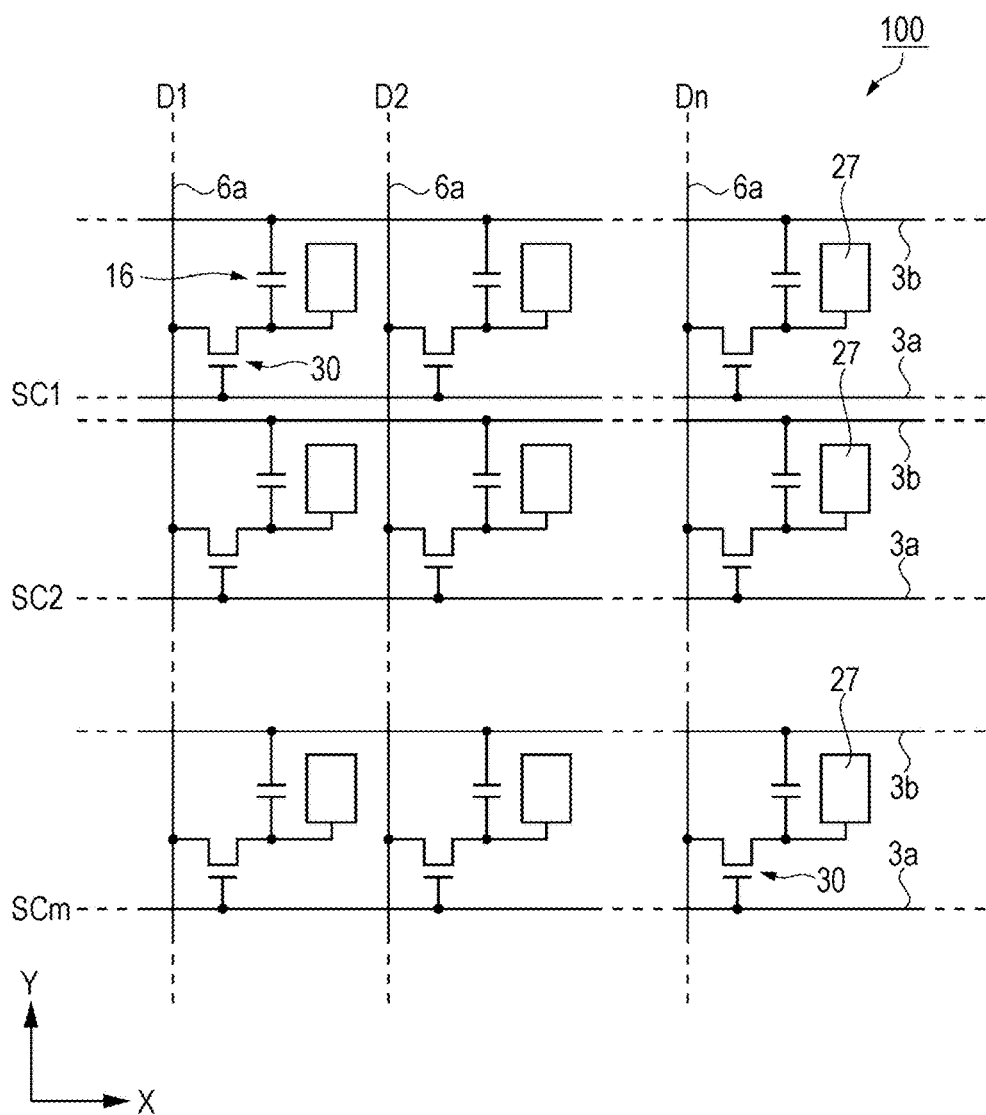
FIG. 3 is an equivalent circuit view illustrating an electric configuration of the liquid crystal device.

FIG. 1 is a schematic plane view illustrating a configuration of a liquid crystal device. FIG. 2 is a schematic cross-section view taken along the line H-H' of the liquid crystal device shown in FIG. 1. FIG. 3 is an equivalent circuit view illustrating an electric configuration of the liquid crystal device. Hereinafter, a configuration of the liquid crystal device will be described with reference to FIG. 1 to FIG. 3.

As shown in FIG. 1 and FIG. 2, a liquid crystal device 100 in the embodiment has an element substrate 10 (a first substrate) and a counter substrate 20 (a second substrate) which are arranged facing each other and a liquid crystal layer 15 interposed by a pair of these substrates. For a first base material 10a configuring the element substrate 10 and a second base material 20a configuring the counter substrate 20, for example, a transparent substrate such as a glass substrate or a quartz substrate is used.

The element substrate 10 is larger than the counter substrate 20 and both substrates are joined through a seal material 14 arranged along an outer periphery of the counter substrate 20. The liquid crystal layer 15 is configured by filling an area which is the inside of the seal material 14 provided in an annular shape in plane view and is between the element substrate 10 and the counter substrate 20 with a liquid crystal having a positive or negative dielectric anisotropy. For the seal material 14, an adhesive agent such as, for example, a thermosetting or ultraviolet curing epoxy resin is employed. A spacer (omitted in the figure) for keeping an interval of a pair of substrates constant is mixed into the seal material 14.

A display region E in which a plurality of pixels P are arrayed, is provided at an inner side than an inner edge of the seal material 14. The display region E may include dummy pixels arranged so as to surround the plurality of pixels P, in addition to the plurality of pixels P which contribute to the display. In addition, while being omitted in FIG. 1 and FIG. 2, a light shielding film (black matrix; BM) which respectively planarly divides the plurality of pixels P in the display region E is provided on the counter substrate 20.

A data line driving circuit 22 is provided between the seal material 14 along one side part of the element substrate 10 and the one side part. In addition, an inspection circuit 25 is provided between the seal material 14 along another side part facing the one side part and the display region E. Furthermore, a scanning line driving circuit 24 is provided between the seal material 14 along two other side parts which are orthogonal with the one side part and face each other and the display region E. A plurality of wirings 29 connecting two scanning line driving circuits 24 are provided between the seal material 14 along the other side part facing the one side part and the inspection circuit 25.

A light shielding film 18 (a parting portion) is provided between the seal material 14 arranged in an annular shape in the counter substrate 20 and the display region E. The light shielding film 18 consists of, for example, a light-shielding metal or metal oxide or the like and a portion inside the light shielding film 18 is the display region E having the plurality of pixels P. Meanwhile, while being omitted in FIG. 1, the light shielding film which planarly divides the plurality of pixels P is also provided in the display region E.

The wiring connected to the data line driving circuit 22 and the scanning line driving circuit 24 is connected to a plurality of terminals for external connection 61 arrayed along the one side part. Hereinafter, description will be given by setting a direction along the one side part to an X direction and setting a direction along the two other side parts which are orthogonal with the one side part and face each other to a Y direction.

As shown in FIG. 2, a translucent pixel electrode 27 and a thin film transistor (TFT: hereinafter, referred to as a "TFT 30") which is a switching element provided for each pixel P, a signal wiring, and a first inorganic alignment film 28 covering these are formed on the surface of the liquid crystal layer 15 side of the first base material 10a.

In addition, a light shielding structure which prevents a switching action from becoming unstable when light enters into a semiconductor layer in the TFT 30 is employed. The element substrate 10 in the invention includes at least the pixel electrode 27, the TFT 30, and the first inorganic alignment film 28.

The light shielding film 18, an flattening layer 33 which is formed so as to cover the light shielding film 18, a counter electrode 31 which is provided so as to cover the flattening layer 33, and a second inorganic alignment film 32 which covers the counter electrode 31 are provided on the surface of the liquid crystal layer 15 side of the counter substrate 20. The counter substrate 20 in the invention includes at least the counter electrode 31 and the second inorganic alignment film 32.

As shown in FIG. 1, the light shielding film 18 surrounds the display region E and is provided to planarly overlap with the scanning line driving circuit 24 and the inspection circuit 25. Accordingly, the light shielding film 18 has a role of blocking light which enters into peripheral circuits including these driving circuits from the counter substrate 20 side and preventing malfunction of the peripheral circuits due to light. In addition, light is blocked so that unnecessary stray light does not enter into the display region E and high contrast is secured in the display in the display region E.

The flattening layer 33 consists of, for example, an inorganic material such as a silicon oxide, has light transmission, and is provided so as to cover the light shielding film 18. In methods of forming such the flattening layer 33, for example, a method in which a film is formed using a plasma chemical vapor deposition (CVD) method or the like, is included.

The counter electrode 31 consists of, for example, a transparent conductive film such as indium tin oxide (ITO), covers the flattening layer 33, and is electrically connected to a wiring of the element substrate 10 side by a vertical conduction portion 26 provided at four corners of the counter substrate 20 as shown in FIG. 1.

The first inorganic alignment film 28 covering the pixel electrode 27 and the second inorganic alignment film 32 covering the counter electrode 31 are selected based on an optical design of the liquid crystal device 100. Examples of the inorganic alignment films 28 and 32 include an inorganic alignment film in which a film of an inorganic material such as silicon oxide ($SiOx$) is formed using a vapor growth method and substantially vertical aligned with respect to a liquid crystal molecule having negative dielectric anisotropy.

Such the liquid crystal device 100 is a transmission type and an optical design of a normally white mode in which the transmittance of the pixel P when a voltage is not applied is larger than the transmittance when a voltage is applied to become a bright display or a normally black mode in which the transmittance of the pixel P when a voltage is not applied is smaller than the transmittance when a voltage is applied to become a dark display, is employed. A polarization element is respectively arranged on an incident side and an exit side of light in accordance with an optical design to be used.

As shown in FIG. 3, the liquid crystal device 100 has a plurality of scanning lines 3a and a plurality of data lines 6a which are insulated from each other and orthogonal to each other at least in the display region E and capacitance lines 3b. A direction in which the scanning line 3a extends is an X direction and a direction in which the data line 6a extends is a Y direction.

The scanning line 3a, the data line 6a, the capacitance line 3b, the pixel electrode 27, the TFT 30, and a capacitance element 16 are provide and these configure a pixel circuit of the pixel P.

The scanning line 3a is electrically connected to a gate of the TFT 30 and the data line 6a is electrically connected to a data line side source drain region (a source region) of the TFT 30. The pixel electrode 27 is electrically connected to a pixel electrode side source drain region (a drain region) of the TFT 30.

The data line 6a is connected to the data line driving circuit 22 (refer to FIG. 1) and supplies image signals D1, D2, . . . , and Dn supplied from the data line driving circuit 22 to the pixel P. The scanning line 3a is connected to the scanning line driving circuit 24 (refer to FIG. 1) and supplies scanning signals SC1, SC2, ..., and SCm supplied from the scanning line driving circuit 24 to each pixel P.

The image signals D1 to Dn supplied from the data line driving circuit 22 to the data line 6a may be line-sequentially supplied in this order or may be supplied for each group with respect to the plurality of data lines 6a adjacent to each other. The scanning line driving circuit 24 supplies the scanning signals SC1 to SCm with respect to the scanning line 3a at a predetermined timing.

The liquid crystal device 100 has a configuration in which the image signals D1 to Dn supplied from the data line 6a are written in the pixel electrode 27 at a predetermined timing by turning the TFT 30 which is a switching element to an On state for only a certain period of time by the input of the scanning signals SC1 to SCm. Then, the image signals D1 to Dn having a predetermined level written in the liquid crystal layer 15 through the pixel electrode 27 is retained between the pixel electrode 27 and the counter electrode 31 arranged facing the pixel electrode 27 through the liquid crystal layer 15 for a certain period of time.

In order to prevent the retained image signals D1 to Dn from leaking, the capacitance element 16 is connected in parallel with a liquid crystal capacitance formed between the pixel electrode 27 and the counter electrode 31. The capacitance element 16 is provided between the pixel electrode side source drain region of the TFT 30 and the capacitance line 3b. The capacitance element 16 has a dielectric layer between two capacitance electrodes.

Figure 4:
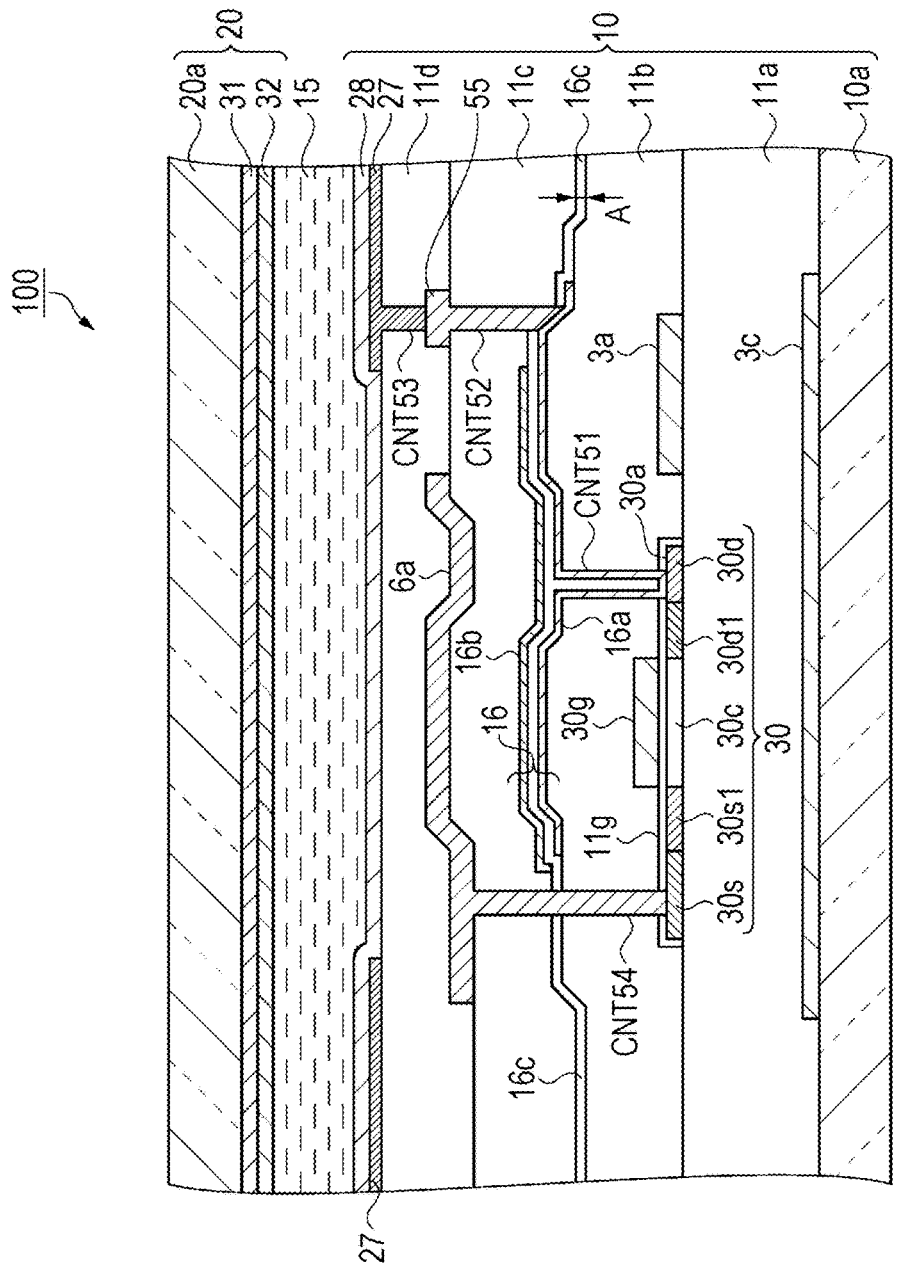
FIG. 4 is a schematic cross-section view illustrating a structure of the liquid crystal device.

FIG. 4 is a schematic cross-section view illustrating a structure of the liquid crystal device. Hereinafter, a structure of the liquid crystal device will be described with reference to FIG. 4. Meanwhile, FIG. 4 illustrates a cross-sectional positional relation of each constituent element and is represented on a scale capable of specifying the positional relation.

As shown in FIG. 4, the liquid crystal device 100 includes the element substrate 10 which is one substrate among a pair of substrates and the counter substrate 20 which is the other substrate arranged facing the element substrate 10. The first base material 10a configuring the element substrate 10 and the second base material 20a configuring the counter substrate 20 are configured with, for example, a quartz substrate or the like, as described above.

A lower-side light shielding film 3c consisting of titanium (Ti), chromium (Cr), or the like is formed on the first base material 10a. The lower-side light shielding film 3c is planarly patterned in a lattice shape and determines the opening region of each pixel. Meanwhile, the lower-side light shielding film 3c may function as a part of the scanning line 3a. A base insulation layer 11a consisting of silicon oxide film or the like is formed on the first base material 10a and the lower-side light shielding film 3c.

The TFT 30, the scanning line 3a, and the like are formed on the base insulation layer 11a. The TFT 30 has, for example, has a semiconductor layer 30a which has a lightly doped drain (LDD) structure and consists of polysilicon or the like, a gate insulation film 11g which is formed on the semiconductor layer 30a, and a gate electrode 30g which is formed on the gate insulation film 11g and consists of polysilicon film or the like. As described above, the scanning line 3a also functions as the gate electrode 30g.

The semiconductor layer 30a is formed as an N-type TFT 30, for example, by injecting N-type impurity ions such as phosphorus (P) ions. Specifically, the semiconductor layer 30a includes a channel region 30c, a data line side LDD region 30s1, a data line side source drain region 30s, a pixel electrode side LDD region 30d1, and a pixel electrode side source drain region 30d.

In the channel region 30c, P-type impurity ions such as boron (B) ions are doped. In other regions (30s1, 30s, 30d1, and 30d), N-type impurity ions such as phosphorus (P) ions are doped. In this manner, the TFT 30 is formed as an N-type TFT.

A first interlayer insulation layer 11b consisting of silicon oxide film or the like is formed on the gate electrode 30g, the base insulation layer 11a, and the scanning line 3a. The capacitance element 16 is provided on the first interlayer insulation layer 11b. Specifically, the capacitance element 16 is formed by arranging a first capacitance electrode 16a as a pixel potential side capacitance electrode which is electrically connected to the pixel electrode side source drain region 30d of the TFT 30 and the pixel electrode 27 and a part of the capacitance line 3b (a second capacitance electrode 16b) as a fixed potential side capacitance electrode through a dielectric film 16c facing each other.

The capacitance line 3b (the second capacitance electrode 16b) consists of, for example, a metal simple substance, an alloy, a metal silicide, a polysilicide, a laminated body thereof, or the like including at least one metal among metals having high melting point such as Ti (titanium), Cr (chromium), W (tungsten), Ta (tantalum), or Mo (molybdenum). Alternatively, it is also possible to form the capacitance line 3b from Al (aluminum) film.

The first capacitance electrode 16a consists of, for example, a conductive polysilicon film and functions as a pixel potential side capacitance electrode of the capacitance element 16. However, the first capacitance electrode 16a may be configured from a single-layer film or a multilayer film including a metal or an alloy in the same way as the capacitance line 3b. The first capacitance electrode 16a has a function of relaying and connecting the pixel electrode 27 and the pixel electrode side source drain region 30d (the drain region) of the TFT 30 through a contact hole CNT52, a relay layer 55, contact holes CNT53 and CNT51, in addition to a function as a pixel potential side capacitance electrode.

The data line 6a is formed on the capacitance element 16 through a second interlayer insulation layer 11c. The data line 6a is electrically connected to the data line side source drain region 30s (the source region) of the semiconductor layer 30a through the contact hole CNT54 opened on the first interlayer insulation layer 11b and the second interlayer insulation layer 11c.

The pixel electrode 27 is formed on the data line 6a through a third interlayer insulation layer 11d. The pixel electrode 27 is electrically connected to the pixel electrode side source drain region 30d (the drain region) of the semiconductor layer 30a by being connected to the first capacitance electrode 16a through the contact holes CNT52 and CNT53 opened on the second interlayer insulation layer 11c and the third interlayer insulation layer 11d and the relay layer 55. Meanwhile, the pixel electrode 27 is formed from a transparent conductive film such as, for example, an ITO film.

The first inorganic alignment film 28 on which an inorganic material such as silicon oxide ($SiO_2$) is obliquely vapor deposited, is provided on the pixel electrode 27 and the third interlayer insulation layer 11d between adjacent pixel electrodes 27. The liquid crystal layer 15 in which a space surrounded by the seal material 14 (refer to FIG. 1 and FIG. 2) is filled with a liquid crystal or the like, is provided on the first inorganic alignment film 28.

On the other hand, the counter electrode 31 is provided over the entire surface of the second base material 20a. The second inorganic alignment film 32 on which an inorganic material such as silicon oxide ($SiO_2$) is obliquely vapor deposited, is provided on the counter electrode 31 (at a lower side in FIG. 4). The counter electrode 31 consists of a transparent conductive film such as, for example, an ITO film in the same way as the pixel electrode 27 described above.

The liquid crystal layer 15 assumes a predetermined alignment state by the inorganic alignment films 28 and 32 in a state in which an electric field is not generated between the pixel electrode 27 and the counter electrode 31. The seal material 14 is an adhesive agent consisting of, for example, a photocurable resin or a thermosetting resin for sticking the element substrate 10 and the counter substrate 20 together at the periphery thereof and spacers such as glass fiber or glass beads for setting a distance between both substrates to a prescribed value are mixed into the seal material 14.

<Configuration of Inorganic Alignment Film>

Figure 5:
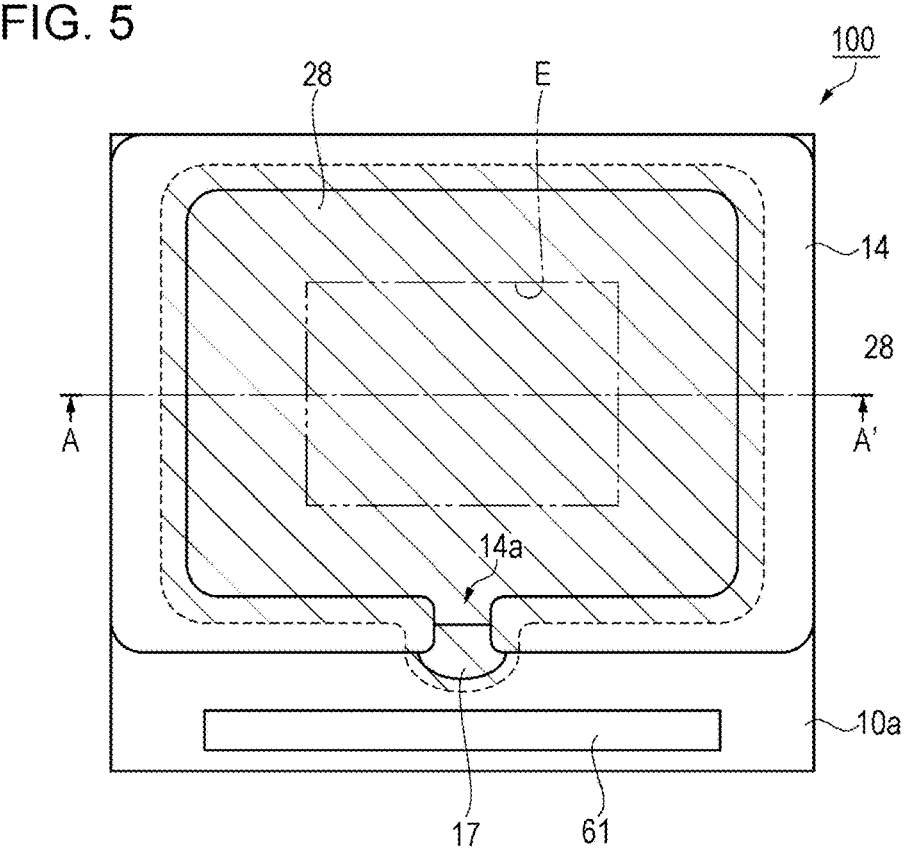
FIG. 5 is a schematic plane view mainly illustrating a configuration of an inorganic alignment film and a seal material (an encapsulant) in the liquid crystal device.
Figure 6:
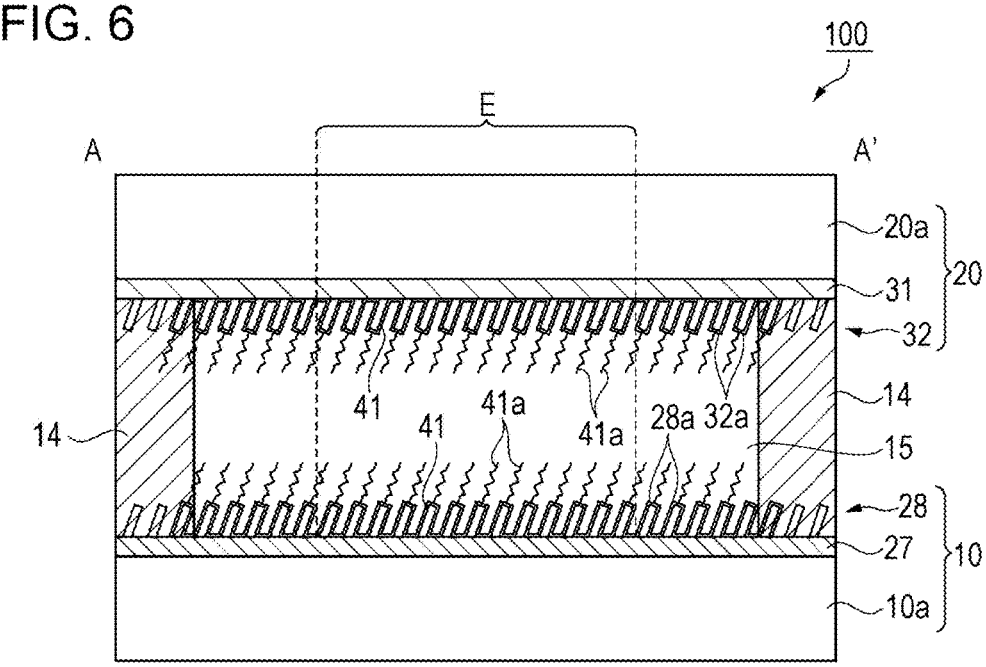
FIG. 6 is a schematic cross-section view taken along the line A-A' of the liquid crystal device shown in FIG. 5.

FIG. 5 is a schematic plane view mainly illustrating a configuration of the inorganic alignment film, the seal material, and the encapsulant in the liquid crystal device. FIG. 6 is a schematic cross-section view taken along the line A-A' of the liquid crystal device shown in FIG. 5. Hereinafter, a region in which the inorganic alignment film, the seal material, and the encapsulant in the liquid crystal device are planarly overlapped, will be mainly described with reference to FIG. 5 and FIG. 6. Meanwhile, an area from the first base material 10a to the third interlayer insulation layer 11d is referred to as the first base material 10a to be described.

As shown in FIG. 5 and FIG. 6, the pixel electrode 27 is provided on the first base material 10a configuring the element substrate 10 of the liquid crystal device 100 (simplified in FIG. 6). As described above, the first inorganic alignment film 28 on which an inorganic material such as silicon oxide ($SiO_2$) is obliquely vapor deposited, is provided on the first base material 10a on which the pixel electrode 27 is provided.

If described in detail, an outer edge of the first inorganic alignment film 28 is provided by extending to at least a region overlapping with a part of the seal material 14 and a region overlapping with an opening region 14a in which the seal material 14 are opened in plane view. The first inorganic alignment film 28 has a columnar structure 28a (column).

The amount in which the first inorganic alignment film 28 and the seal material 14 are overlapped in plane view, is from approximately ⅓ to ½ of a width of the seal material 14. In this manner, by providing the first inorganic alignment film 28 so as to overlap with a part of the seal material 14, it is possible to enhance the adhesive force between the element substrate 10 (the first inorganic alignment film 28) and the seal material 14. The thickness of the first inorganic alignment film 28 is, for example, 750 Å.

The plurality of columnar structures 28a is obliquely provided with respect to the first base material 10a and a pretilt angle is given to a liquid crystal molecule of the liquid crystal layer 15 depending on the tilt angle. Here, the pretilt angle means an angle formed by a direction orthogonal to the surface of the first base material 10a and a long axis direction of the liquid crystal molecule. An encapsulant 17 is used for filling the liquid crystal layer 15 in the opening region of the seal material 14.

As shown FIG. 6, a surface layer 41 which is subjected to the surface treatment is provided on the surface of the first inorganic alignment film 28. The thickness of the surface layer 41 is, for example, from 2 nm to 20 nm. The surface layer 41 has an alkyl group 41a. Here, the alkyl group 41a means an alkyl group including an organic functional group.

In a case where the organic functional group is an alkyl ($C_nH_{2n+1}$), as the carbon number is larger, the molecular weight is large and the organic functional group becomes a long chain. In addition, as the carbon number is small, the molecular weight is small and the organic functional group becomes a short chain. The organic functional group having a long chain means an organic functional group in which the carbon number n is 8 or more ($n \geq 8$). The organic functional group having a short chain means an organic functional group in which the carbon number n is 1 or 2 ($n \leq 2$).

On the other hand, the counter electrode 31 is provided on the second base material 20a (the face of the liquid crystal layer 15 side of the second base material 20a) configuring the counter substrate 20. The second inorganic alignment film 32 having the columnar structure 32a and the surface layer 41 are provided on the surface of the counter electrode 31 in the same way as the element substrate 10 side.

The alkyl group 41a is provided on the surface layer 41. In this manner, since the alkyl group 41a is given to the first inorganic alignment film 28 and the second inorganic alignment film 32, the covering ratio in this region increases, and thus it is possible to enhance light resistance. Therefore, for example, even in a case of applying strong light to the pixel electrode 27, it is possible to suppress the occurrence of the decomposition of the liquid crystal due to a chemical reaction at an interface between the first inorganic alignment film 28 and the liquid crystal.

In addition, since the first inorganic alignment film 28 is provided under the encapsulant 17, it becomes possible to make the surface layer 41 uneven following an unevenness of the columnar structure 28a (column) configuring the first inorganic alignment film 28. Therefore, when the encapsulant 17 is provided in the opening region 14a on the surface layer 41, the adhesive area to the encapsulant 17 can increase due to an unevenness on the surface layer 41, and thus it is possible to suppress the peeling off the encapsulant 17 from the element substrate 10.

Meanwhile, the amount in which the encapsulant 17 comes out from an outer edge of the seal material 14 is, for example, from 100 μm to 150 μm. In addition, the shape of the second inorganic alignment film 32 of the counter substrate 20 side and the planar shape of the surface layer 41 are the same as the shape of the element substrate 10 side.

<Method of Manufacturing Liquid Crystal Device>

Figure 7:
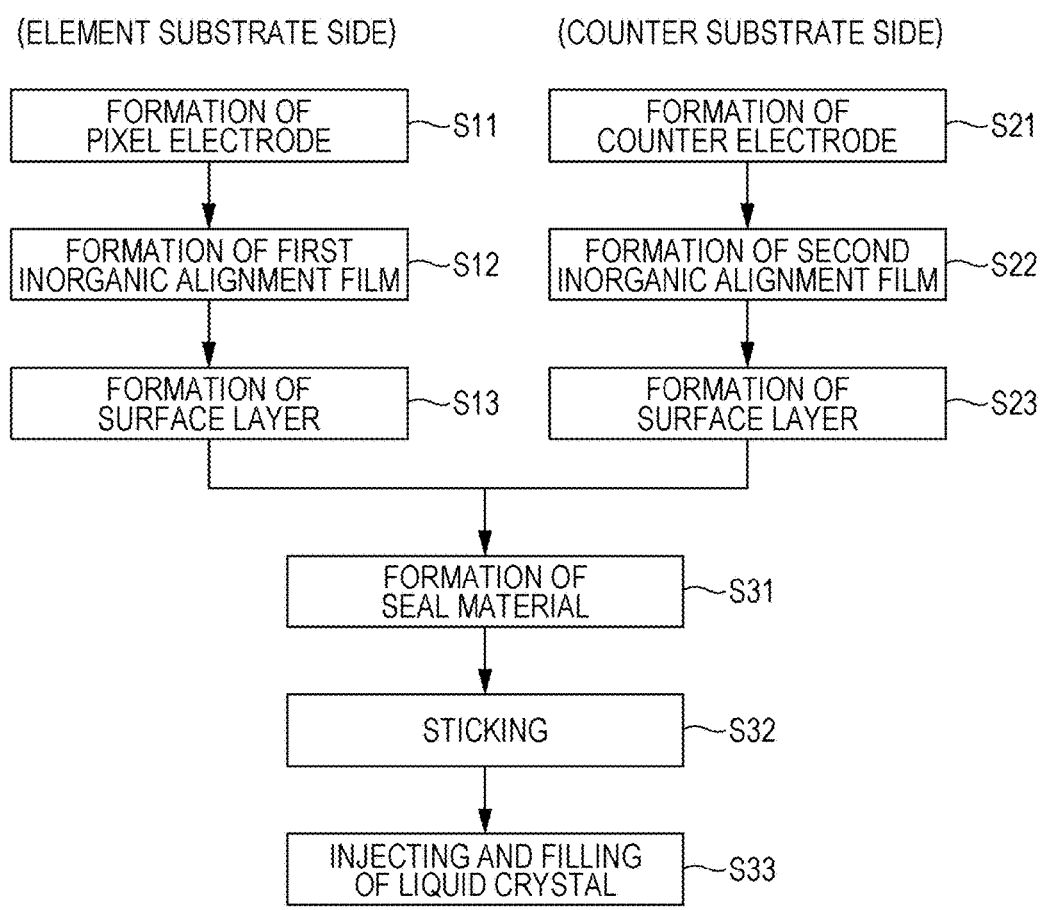
FIG. 7 is a flow chart illustrating a method of manufacturing the liquid crystal device in an order of steps.
Figure 8:
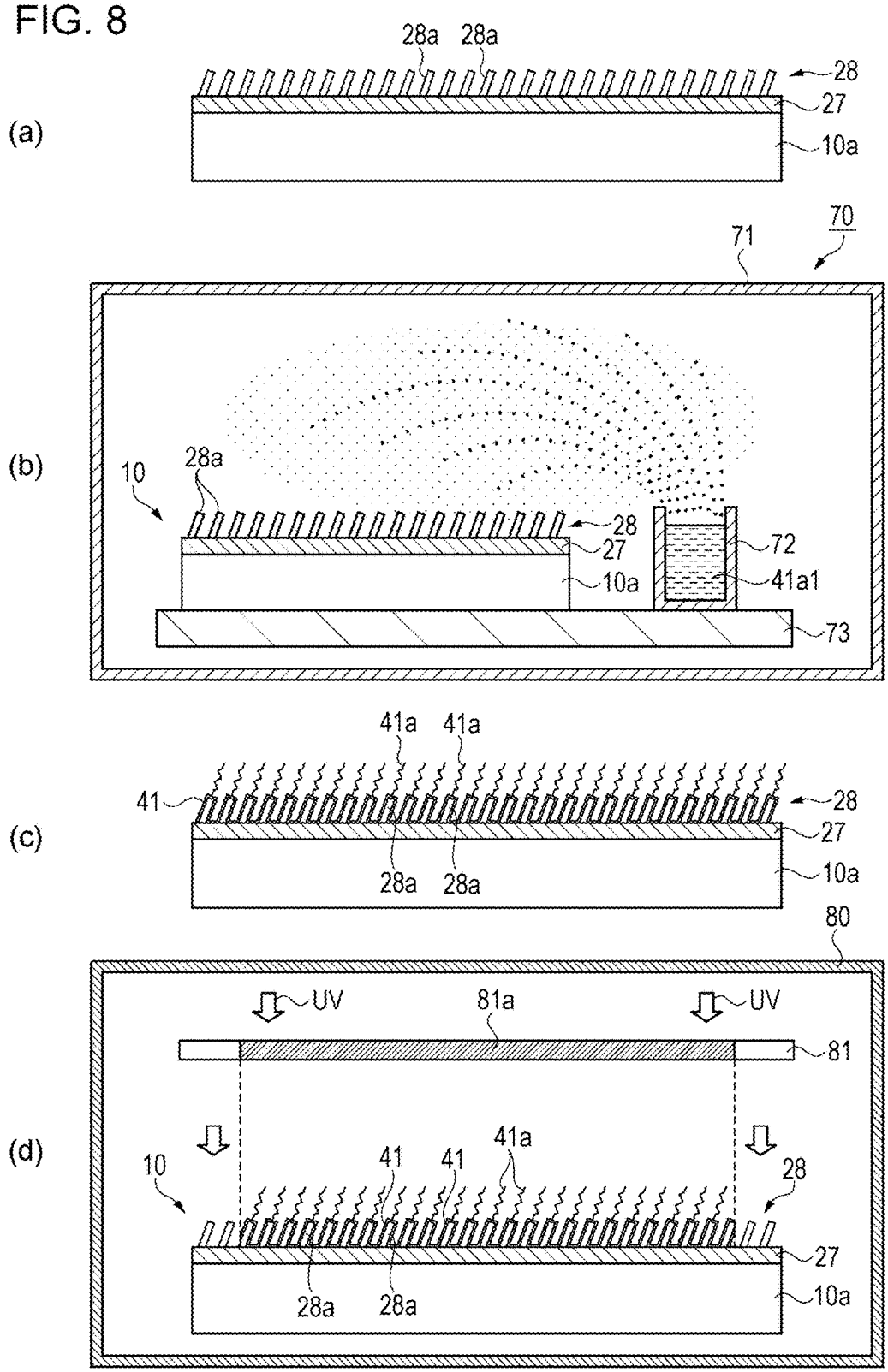
FIG. 8 is a schematic view illustrating a part of the manufacturing method in the method of manufacturing the liquid crystal device.

FIG. 7 is a flow chart illustrating a method of manufacturing the liquid crystal device in an order of steps. FIG. 8 is a schematic view illustrating a part of the manufacturing method in the method of manufacturing the liquid crystal device. Hereinafter, the method of manufacturing the liquid crystal device will be described with reference to FIG. 7 and FIG. 8.

Firstly, the method of manufacturing the element substrate 10 side will be described. Meanwhile, an area from the first base material 10a to the third interlayer insulation layer 11d is referred to as the first base material 10a to be described. First, in a step S11, the pixel electrode 27 and the like are formed on the first base material 10a consisting of a glass substrate or the like using a well-known film formation technology, photolithography technology, and etching technology.

In a step S12 (an inorganic alignment film forming step), the first inorganic alignment film 28 is formed. Specifically, as shown in FIG. 8(a), the first inorganic alignment film 28 having the columnar structure 28a is formed by obliquely vapor depositing an inorganic material such as silicon oxide on the entire of the third interlayer insulation layer 11d (the first base material 10a) on which the pixel electrode 27 is provided.

In a step S13 (a surface layer forming step), the surface layer 41 is formed on the first inorganic alignment film 28. Specifically, as shown in FIG. 8(b), a chemical vapor deposition method (hereinafter, referred to as a CVD) is used. Hereinafter, a structure of a CVD apparatus 70 and a method of manufacturing the surface layer 41 will be described with reference to FIG. 8(b).

As shown in FIG. 8(b), firstly, the element substrate 10 and a container 72 containing a silane coupling agent 41a1 having the liquid alkyl group 41a are put into a sealed chamber 71 of a vacuum tank of the CVD apparatus 70. Next, the container 72 is heated by a heater 73 and the silane coupling agent 41a1 is vaporized. Accordingly, as shown in FIG. 8(c), the surface layer 41 to which the alkyl group 41a is given, is formed on the surface of the pixel electrode 27 and on the surface of the exposed third interlayer insulation layer 11d.

That is, as shown in FIG. 8(c), the surface layer 41 having the alkyl group 41a is formed on the surface of the first inorganic alignment film 28 by the reaction of a silanol group of the surface of the first inorganic alignment film 28 with a hydrolysable group of the silane coupling agent 41a1 and the adhesion of the silane coupling agent 41a1.

Next, a part of the surface layer 41 (the alkyl group 41a) formed by irradiating the element substrate 10 with an ultraviolet ray (UV) is decomposed and removed. Hereinafter, an irradiation method of an ultraviolet ray will be described with reference to FIG. 8(d).

As shown in FIG. 8(d), firstly, the element substrate 10 is put into an apparatus 80 which irradiates an ultraviolet ray. Afterward, a region of a part of the element substrate 10 is irradiated with an ultraviolet ray (vacuum ultraviolet: UV) using a photomask 81 having a light shielding portion 81a.

Accordingly, in plane view, the surface layer 41 which is formed from the display region E up to a part of the seal material 14 and on the first inorganic alignment film 28 in a region overlapping with the encapsulant 17 remains and the surface layer 41 (the alkyl group 41a) in the region other than that is decomposed and removed. As to the removal of the surface layer 41, it is considered that it is because an organic functional group of the surface layer 41 is directly excited and an active oxygen such as ozone is generated by the irradiation with a vacuum ultraviolet ray and the surface layer 41 excited by the active oxygen is oxidized.

Next, a method of manufacturing the counter substrate 20 side will be described. Firstly, in a step S21, the counter electrode 31 is formed on the second base material 20a consisting of a translucent material such as a glass substrate using a well-known film formation technology, photolithography technology, and etching technology.

In a step S22, the second inorganic alignment film 32 is formed on the counter electrode 31. In the method of manufacturing the second inorganic alignment film 32, for example, the second inorganic alignment film 32 is formed using an oblique vapor deposition method in the same way as the first inorganic alignment film 28 of the element substrate 10 side.

In a step S23, the surface layer 41 is formed on the second inorganic alignment film 32. Specifically, the surface layer 41 is formed using a chemical vapor deposition method (CVD) in the same way as the element substrate 10 side. Afterward, the counter substrate 20 is irradiated with an ultraviolet ray (UV) and a part of the surface layer 41 which is formed is decomposed and removed. Specifically, the surface layer 41 is formed in the same way as the element substrate 10 side.

Accordingly, a part of the surface layer 41 which is given onto the second base material 20a is decomposed and removed in the same way as the element substrate 10 side. Next, a method of sticking the element substrate 10 and the counter substrate 20 together will be described.

In a step S31 (a seal material forming step), the seal material 14 is applied onto the element substrate 10. Specifically, for example, a relative positional relation between the element substrate 10 and a dispenser (a discharge apparatus is also available) is varied and the seal material 14 is applied to a peripheral edge part (so as to surround the display region E) of the display region E on the element substrate 10.

In a step S32 (a sticking step), the element substrate 10 and the counter substrate 20 are stuck together. Specifically, the element substrate 10 and the counter substrate 20 are stuck together through the seal material 14 which is applied onto the element substrate 10. More specifically, the element substrate 10 and the counter substrate 20 are stuck together while ensuring the positional accuracy of a planar vertical direction and horizontal direction of each of substrates 10 and 20.

In a step S33 (a injecting step and an encapsulant forming step), a liquid crystal is injected from a liquid crystal injection port (an opening region 14a) into the inside of a structure body and afterward, the liquid crystal injection port is filled with the encapsulant 17. By the above, the liquid crystal device 100 is completed.

<Configuration of Electronic Apparatus>

Figure 9:
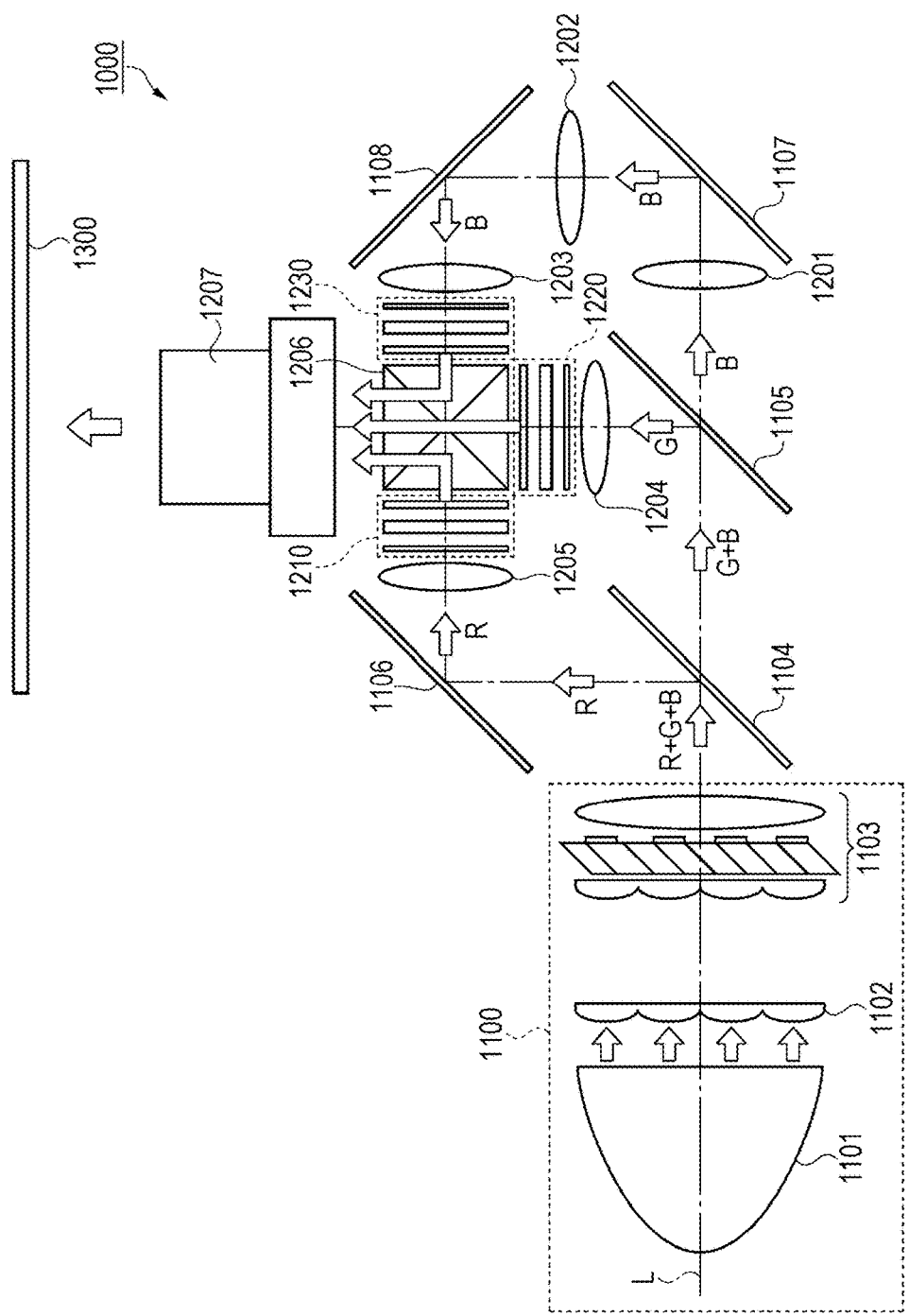
FIG. 9 is an outline view illustrating a configuration of a projection type display apparatus including the liquid crystal device.

Next, a projection type display apparatus as an electronic apparatus in the embodiment will be described with reference to FIG. 9. FIG. 9 is an outline view illustrating a configuration of a projection type display apparatus provided with the liquid crystal device described above.

As shown in FIG. 9, a projection type display apparatus 1000 in the embodiment includes a polarization lighting device 1100 arranged along a system optical axis L, two dichroic mirrors 1104 and 1105 as a light separation element, three reflection mirrors 1106, 1107, and 1108, five relay lenses 1201, 1202, 1203, 1204, and 1205, three transmission type liquid crystal light valves 1210, 1220, and 1230 as an optical modulation means, a cross dichroic prism 1206 as a photosynthetic element, and a projection lens 1207.

The polarization lighting device 1100 is schematically configured with a lamp unit 1101 as a light source consisting of a white light source such as an ultrahigh pressure mercury lamp or a halogen lamp, an integrator lens 1102, and a polarization conversion element 1103.

The dichroic mirror 1104 reflects red light (R) and transmits green light (G) and blue light (B) among polarized light fluxes emitted from the polarization lighting device 1100. Another dichroic mirror 1105 reflects green light (G) and transmits blue light (B), which are transmitted through the dichroic mirror 1104.

After red light (R) reflected by the dichroic mirror 1104 is reflected by the reflection mirror 1106, red light (R) enters into the liquid crystal light valve 1210 via the relay lens 1205. Green light (G) reflected by the dichroic mirror 1105 enters into the liquid crystal light valve 1220 via the relay lens 1204. Blue light (B) transmitted through the dichroic mirror 1105 enters into the liquid crystal light valve 1230 via a light guide system consisting of three relay lenses 1201, 1202, and 1203 and two reflection mirrors 1107 and 1108.

The liquid crystal light valves 1210, 1220, and 1230 are respectively arranged facing incident surfaces for each color light of the cross dichroic prism 1206. The color light which enters into the liquid crystal light valves 1210, 1220, and 1230 is modulated based on video information (video signal) and emitted toward the cross dichroic prism 1206.

As to this prism, four right angle prisms are stuck together and a dielectric multilayer film which reflects red light and a dielectric multilayer film which reflects blue light are formed in a cross shape on its inner surface. Three color lights are synthesized by these dielectric multilayer films and light representing a color image is synthesized. The synthesized light is projected onto a screen 1300 by a projection lens 1207 which is a projection optical system and an image is enlarged and displayed.

The liquid crystal device 100 described above is applied to the liquid crystal light valve 1210. The liquid crystal device 100 is arranged with a gap between a pair of polarization elements which are arranged in a crossed Nicol state on an incident side and an exit side of the color light. Other liquid crystal light valves 1220 and 1230 are the same as the liquid crystal light valve 1210.

According to such the projection type display apparatus 1000, since the liquid crystal device 100 in which the seizure or the like is suppressed, is used as the liquid crystal light valves 1210, 1220, and 1230, it is possible to realize a high display quality.

Meanwhile, as an electronic apparatus on which the liquid crystal device 100 is mounted, there are various kinds of electronic apparatuses such as a head up display, a smartphone, an electrical view finder (EVF), a mobile mini projector, a mobile phone, a mobile computer, a digital camera, a digital video camera, a display, an onboard equipment, an audio equipment, an exposure apparatus, or a lightning equipment, in addition to the projection type display apparatus 1000.

Hereinbefore, as described in detail, according to the liquid crystal device 100, the method of manufacturing the liquid crystal device 100, and the electronic apparatus of the embodiment, effects shown below are obtained.

(1) According to the liquid crystal device 100 of the embodiment, since the first inorganic alignment film 28 is provided under the encapsulant 17, it becomes possible to make the element substrate 10 uneven following an unevenness of the columnar structure 28*a* (column) configuring the first inorganic alignment film 28. Therefore, when the encapsulant 17 is provided in the opening region 14*a* on the element substrate 10, the adhesive area to the encapsulant 17 can increase due to an unevenness on the element substrate 10, and thus it is possible to suppress the peeling off the encapsulant 17 from the element substrate 10. In addition, since the encapsulant 17 fills the liquid crystal layer in a wet state in which the liquid crystal is put into an area surrounded by the seal material 14, the adhesion becomes more severe. However, it is possible to enhance the adhesion between the element substrate 10 and the seal material 14 by expanding the region of the first inorganic alignment film 28 up to the region of the encapsulant 17.

(2) According to the liquid crystal device 100 of the embodiment, since the surface layer 41 is provided on the surface of the first inorganic alignment film 28, it becomes possible to enhance light resistance and it is possible to irradiate the liquid crystal device 100 with strong light.

(3) According to the method of manufacturing the liquid crystal device 100 of the embodiment, since the first inorganic alignment film 28 is formed under the encapsulant 17, it becomes possible to make the element substrate 10 uneven following an unevenness of the columnar structure 28*a* (column) configuring the first inorganic alignment film 28. Therefore, when the encapsulant 17 is formed in the opening region 14*a* on the element substrate 10, the adhesive area to the encapsulant 17 can increase due to an unevenness on the element substrate 10, and thus it is possible to suppress the peeling off the encapsulant 17 from the element substrate 10.

(4) According to the electronic apparatus of the embodiment, since the electronic apparatus is provided with the liquid crystal device 100 described above, it is possible to provide an electronic apparatus having high reliability.

Meanwhile, the aspects of the invention are not limited to the embodiments described above, can be appropriately changed within a range which is not contrary to the gist and the concept of the invention understood from the scope of claims and the whole specification, and are included in the technical scope of the aspects of the invention. In addition, the invention can be also carried out in forms as described below.

Modification Example 1

Figure 10:
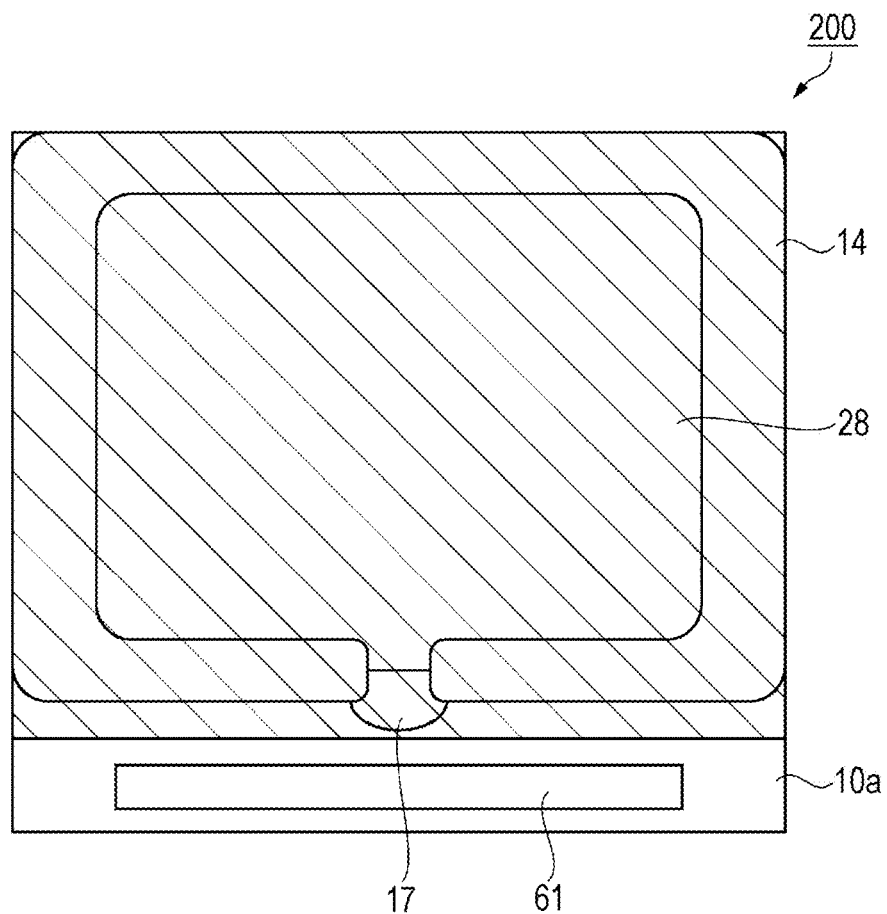
FIG. 10 is a schematic plane view illustrating a configuration of a liquid crystal device of Modification Example.

For example, as a liquid crystal device 200 shown in FIG. 10, the first inorganic alignment film 28 may be provided over the entire region overlapping with the seal material 14 and the encapsulant 17 on the first base material 10*a* in plane view, without being limited to providing the first inorganic alignment film 28 by extending to the region overlapping with the encapsulant 17 on the first base material 10*a* and the region overlapping with a part of the seal material 14 as described above. Accordingly, since the first inorganic alignment film 28 is provided on the substantially entire first base material 10*a*, even in a case of manufacturing using a mask, it is possible to facilitate the manufacture.

Modification Example 2

The liquid crystal device 100 may have a configuration in which the surface layer 41 is not provided in a case where the liquid crystal device 100 is not irradiated with strong light, without being limited to providing the surface layer 41 between the encapsulant 17 and the first inorganic alignment film 28 as described above.

Modification Example 3

The invention may be applied to for example, a reflection type liquid crystal device, without being limited to being the transmission type liquid crystal device 100 as described above.

REFERENCE SIGNS LIST

3*a* SCANNING LINE
3*b* CAPACITANCE LINE
3*c* LOWER-SIDE LIGHT SHIELDING FILM
6*a* DATA LINE
10 ELEMENT SUBSTRATE AS FIRST SUBSTRATE
10*a* FIRST BASE MATERIAL
11*a* BASE INSULATION LAYER
11*b* FIRST INTERLAYER INSULATION LAYER
11*c* SECOND INTERLAYER INSULATION LAYER
11*d* THIRD INTERLAYER INSULATION LAYER
11*g* GATE INSULATION FILM
14 SEAL MATERIAL
14*a* OPENING REGION
15 LIQUID CRYSTAL LAYER

16 CAPACITANCE ELEMENT
16a FIRST CAPACITANCE ELECTRODE
16b SECOND CAPACITANCE ELECTRODE
16c DIELECTRIC FILM
17 ENCAPSULANT
18 LIGHT SHIELDING FILM
20 COUNTER SUBSTRATE AS SECOND SUBSTRATE
20a SECOND BASE MATERIAL
22 DATA LINE DRIVING CIRCUIT
24 SCANNING LINE DRIVING CIRCUIT
25 INSPECTION CIRCUIT
26 VERTICAL CONDUCTION PORTION
27 PIXEL ELECTRODE
28 FIRST INORGANIC ALIGNMENT FILM
28a, 32a COLUMNAR STRUCTURE
29 WIRING
30 TFT
30a SEMICONDUCTOR LAYER
30c CHANNEL REGION
30d PIXEL ELECTRODE SIDE SOURCE DRAIN REGION
30d1 PIXEL ELECTRODE SIDE LDD REGION
30g GATE ELECTRODE
30s DATA LINE SIDE SOURCE DRAIN REGION
30s1 DATA LINE SIDE LDD REGION
31 COUNTER ELECTRODE
32 SECOND INORGANIC ALIGNMENT FILM
33 FLATTENING LAYER
41 SURFACE LAYER
41a ALKYL GROUP
CNT51, 52, 53, 54 CONTACT HOLE
55 RELAY LAYER
61 TERMINAL FOR EXTERNAL CONNECTION
70 CVD APPARATUS
71 SEALED CHAMBER
72 CONTAINER
73 HEATER
81 PHOTOMASK
81a LIGHT SHIELDING PORTION
100, 200 LIQUID CRYSTAL DEVICE
1000 PROJECTION TYPE DISPLAY APPARATUS
1100 POLARIZATION LIGHTING DEVICE
1101 LAMP UNIT
1102 INTEGRATOR LENS
1103 POLARIZATION CONVERSION ELEMENT
1104, 1105 DICHROIC MIRROR
1106, 1107, 1108 REFLECTION MIRROR
1201, 1202, 1203, 1204, 1205 RELAY LENS
1206 CROSS DICHROIC PRISM
1207 PROJECTION LENS
1210, 1220, 1230 LIQUID CRYSTAL LIGHT VALVE
1300 SCREEN

The invention claimed is:

1. A liquid crystal device comprising:
a first substrate;
a second substrate arranged facing the first substrate;
a seal material arranged between the first substrate and the second substrate;
a liquid crystal layer arranged between the first substrate and the second substrate;
an encapsulant filling the liquid crystal layer in an opening region of the seal material;
a first inorganic alignment film arranged between the first substrate and the liquid crystal layer;
an organic surface layer arranged on the first inorganic alignment film between the first inorganic alignment film and the encapsulant; and
a second inorganic alignment film arranged between the second substrate and the liquid crystal layer,
wherein the first inorganic alignment film and the organic surface layer are disposed so as to overlap entirely the encapsulant, when viewed from the second substrate side.

2. The liquid crystal device according to claim 1, wherein the first inorganic alignment film is arranged so as to overlap with at least a part of a region in which the seal material is arranged when being viewed from the second substrate side.

3. The liquid crystal device according to claim 1, wherein the first inorganic alignment film and the organic surface layer are arranged so as to overlap only a part of a region in which the seal material is arranged when viewed from the second substrate side.

4. The liquid crystal device according to claim 1, wherein the first inorganic film and the organic surface layer overlap from approximately one-third (⅓) to approximately one-half (½) of a width of the seal material.

5. A liquid crystal device comprising:
a first substrate;
a first inorganic alignment film arranged between the first substrate and a liquid crystal layer; and
an organic surface layer arranged on the first inorganic alignment film between the first inorganic alignment film and the liquid crystal layer;
wherein the first inorganic alignment film and the organic surface layer are disposed so as to overlap entirely an encapsulant, which fills the liquid crystal layer in an opening region of a seal material, when viewed from the liquid crystal layer side.

6. The liquid crystal device according to claim 5, wherein the first inorganic alignment film is arranged so as to overlap with at least a part of a region in which the seal material is arranged when being viewed from the liquid crystal layer side.

7. A method of manufacturing a liquid crystal device comprising:
an inorganic alignment film forming step of forming a first inorganic alignment film on a first substrate;
a surface layer forming step in which an organic surface layer is formed on the first inorganic alignment film;
a seal material forming step of forming a seal material on the first substrate;
a sticking step of sticking the first substrate and a second substrate on which a second inorganic alignment film is formed together through the seal material;
an injecting step of injecting a liquid crystal between the first substrate and the second substrate from an opening region of the seal material; and
an encapsulant forming step of forming an encapsulant filling the liquid crystal in the opening region,
wherein the first inorganic alignment film and the organic surface layer are disposed so as to overlap entirely the encapsulant, when viewed from the second substrate side.

8. An electronic apparatus comprising the liquid crystal device according to claim 1.

9. An electronic apparatus comprising the liquid crystal device according to claim 5.

* * * * *